June 30, 1970            B. MITCHELL            3,517,684
AUTOMATIC WATER SPRINKLER CONTROL SYSTEM
Filed Aug. 17, 1967            3 Sheets-Sheet 1
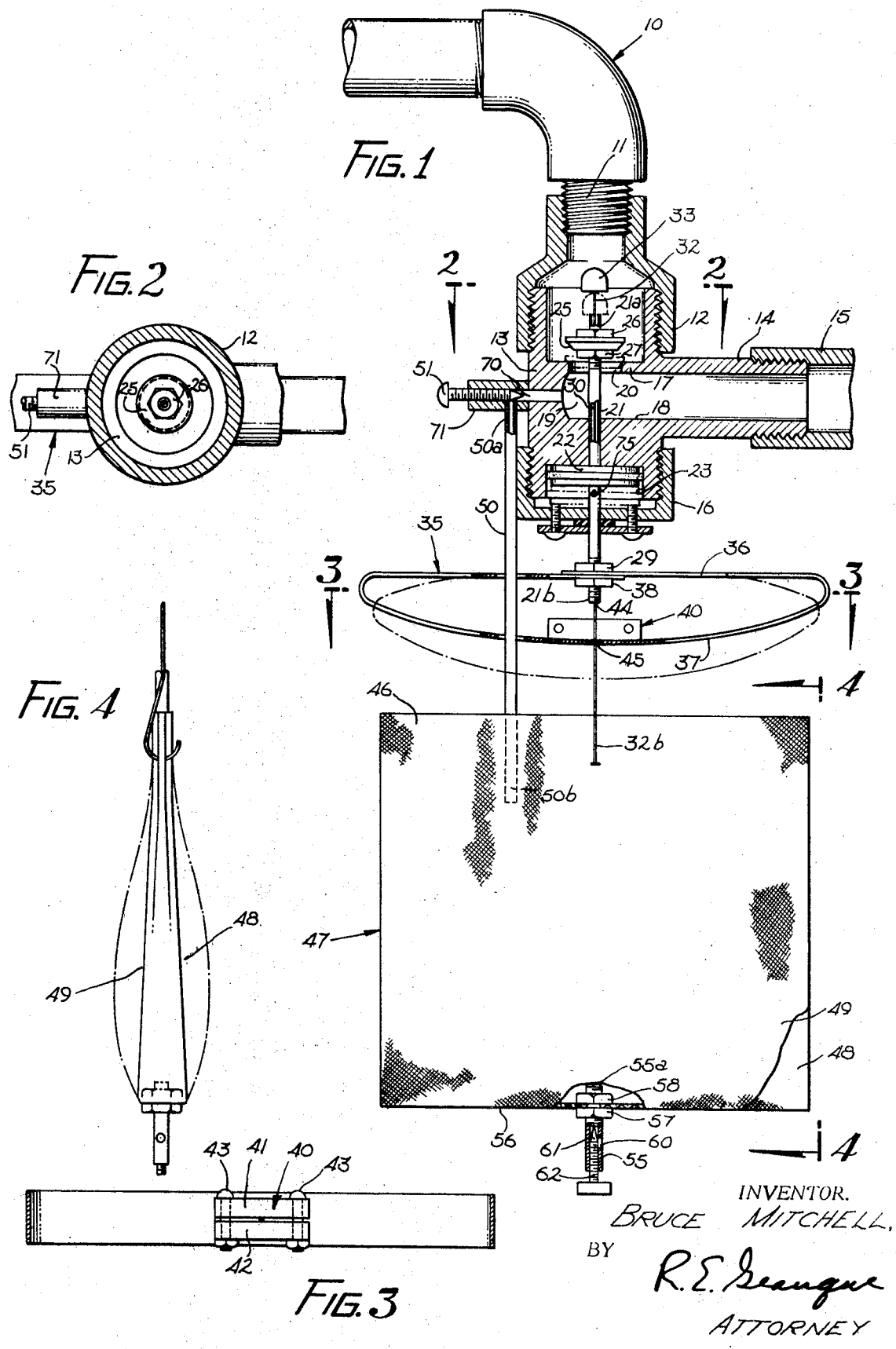
INVENTOR.
BRUCE MITCHELL,
BY
R. E. Geauque
ATTORNEY

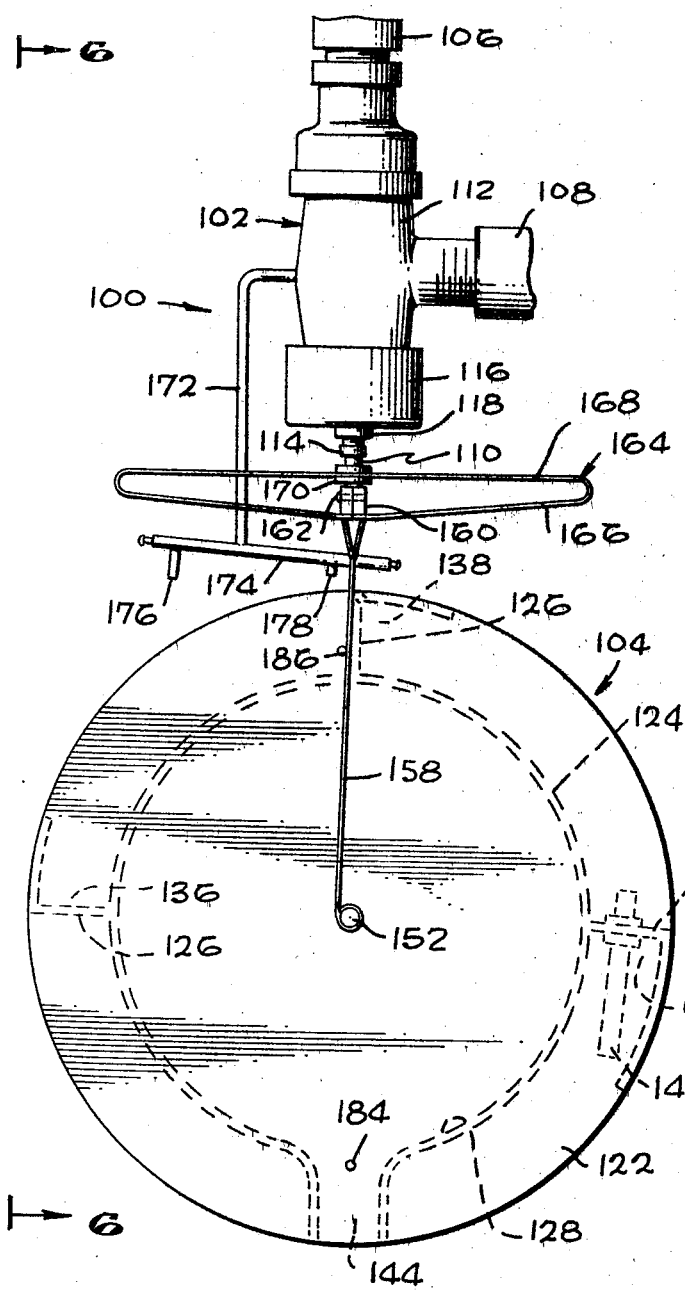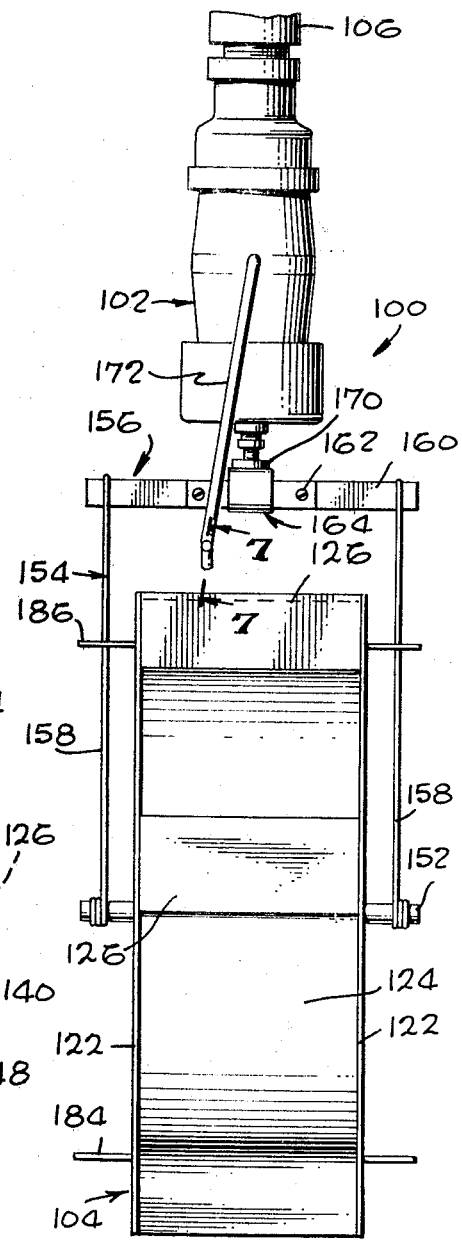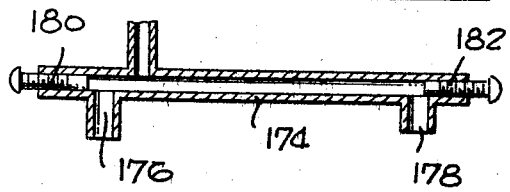

June 30, 1970   B. MITCHELL   3,517,684
AUTOMATIC WATER SPRINKLER CONTROL SYSTEM
Filed Aug. 17, 1967   3 Sheets-Sheet 3
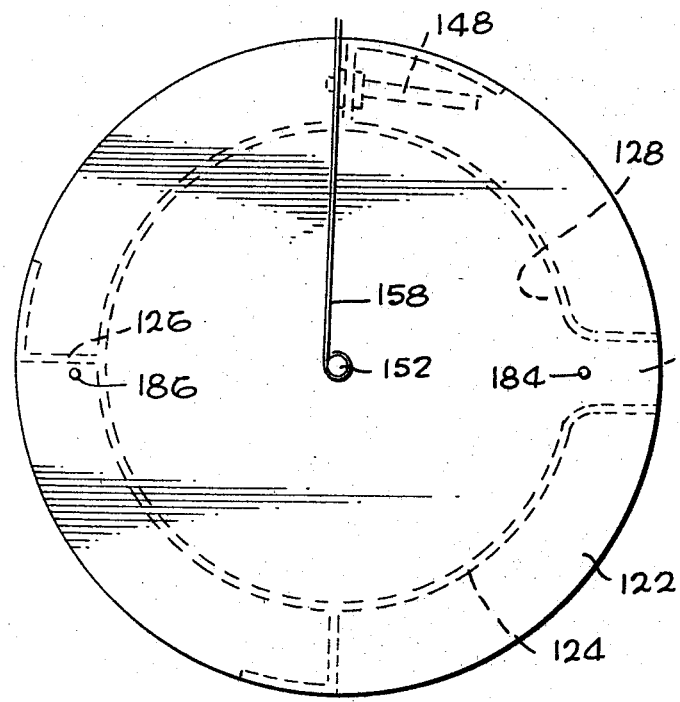
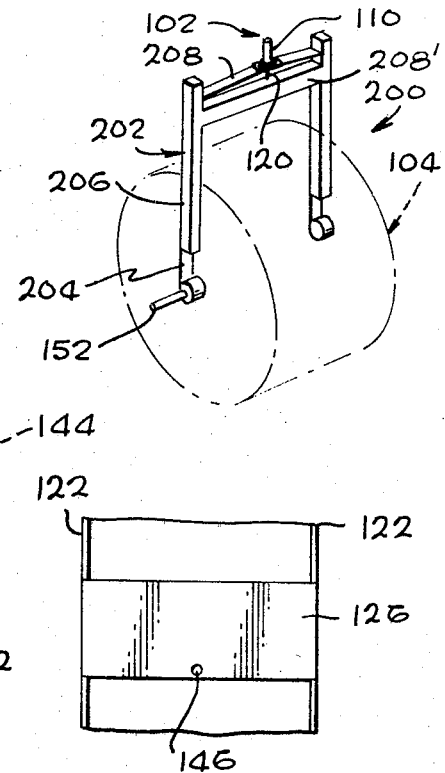
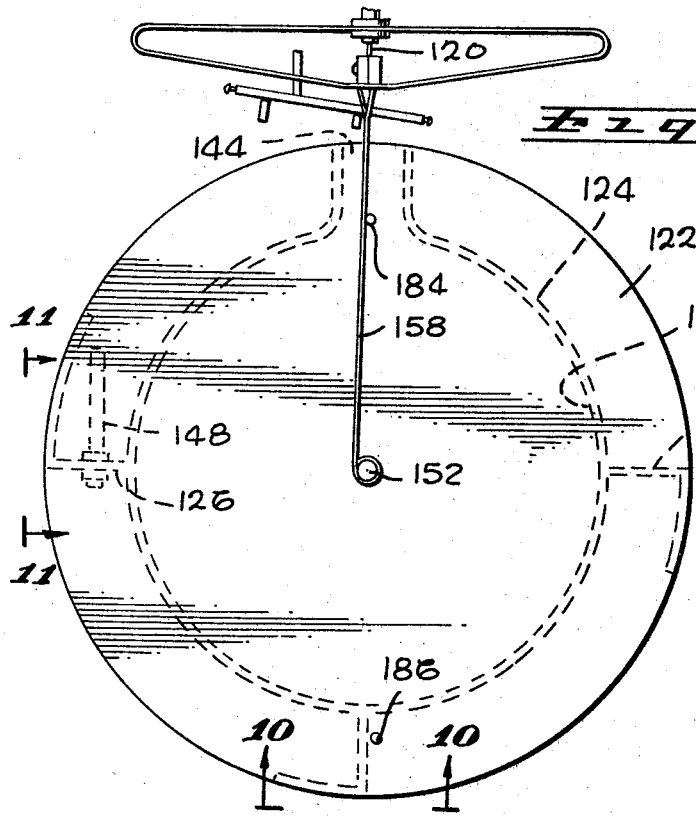
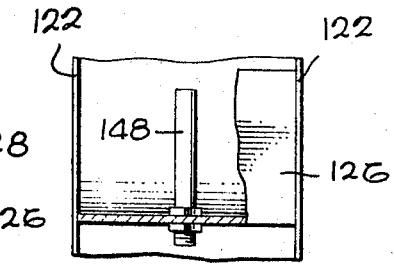
BRUCE MITCHELL
INVENTOR.
BY R. E. Geanger
ATTORNEY

United States Patent Office 3,517,684
Patented June 30, 1970

3,517,684
AUTOMATIC WATER SPRINKLER CONTROL SYSTEM
Bruce Mitchell, 13794 Astoria St., Sylmar, Calif. 91342
Continuation-in-part of application Ser. No. 478,154, Aug. 9, 1965. This application Aug. 17, 1967, Ser. No. 662,846
Int. Cl. A01g 25/00; F16k 31/12
U.S. Cl. 137—78                9 Claims

ABSTRACT OF THE DISCLOSURE

An automatic liquid flow control device having a flow control valve and a container which is filled with liquid at a controlled rate through the valve when the latter is opened to provide a bias force for closing the valve and from which the liquid is thereafter dissipated at a controlled rate by evaporation and/or drainage to effect reopening of the valve.

---

The present application is a continuation-in-part of my copending application Ser. No. 478,154, filed Aug. 9, 1965, and entitlde, Automatic Water Sprinkler Control System, now abandoned.

This invention relates generally to liquid flow control means and, more particularly, to an automatic liquid flow control device in which the liquid being dispensed provides both a variable valve operating force for effecting periodic opening and closing a flow control valve and a timing function for retaining the valve in its open and closed positions for predetermined intervals of time.

As will appear from the ensuing description, the present automatic flow control device may be utilized to advantage in a variety of flow systems. However, the primary application of the present flow control device involves controlling water flow to the discharge heads of an irrigation or sprinkler system. For this reason, the invention will be disclosed in connection with this particular application.

Prior sprinkler control systems, such as shown in U.S. Pat. No. 2,895,493, have utilized the evaporation rate from an absorbent material to control the flow of water to sprinkler or other devices. However, such devices are too complicated and expensive and cannot provide for the exact control of sprinkling time. The present invention utilizes a valve operating water ballast means or container which is fed with water at a controlled rate directly from the water line and which, when filled to a predetermined level, provides a bias force for closing a valve to cut off the water flow to the sprinkler heads. Means are provided for dissipating the water from the container at a controlled rate and thereby reducing the bias force furnished by the water sufficiently to permit the valve to again open. The rate at which water is fed to the container determines the open time of the flow control valve and hence the time duration of the operating mode of the sprinkler system. The rate at which water is dissipated from the container determines the closed time of the flow control valve and hence the shutdown time of the sprinkler system. According to the present invention, the rates at which water is fed to and dissipated from the container are adjusted or set to effect periodic operation and shutdown of the sprinkler system for predetermined periods of time. Thus, no balance weights for the valve are required as in prior devices and a very simple valve struction can be utilized.

These and other objects of the invention not specifically set forth above will become readily apparent from the accompanying description and drawings in which:

FIG. 1 is an elevational view, partly in section of an automatic water flow control device according to the present invention;

FIG. 2 is a section along line 2—2 of FIG. 1;
FIG. 3 is a section along line 3—3 of FIG. 1;
FIG. 4 is an elevational view looking in the direction of the arrows on line 4—4 in FIG. 1;
FIG. 5 is an elevational view of a modified water flow control device according to the invention;
FIG. 6 is an elevational view looking in the direction of the arrows on line 6—6 in FIG. 5;
FIG. 7 is an enlarged section taken on line 7—7 in FIG. 6;
FIG. 8 is a fragmentary elevational view of a modified flow control device in another position of operation;
FIG. 9 is a fragmentary elevational view of the modified flow control device and yet another position of operation;
FIG. 10 is an enlarged elevational view looking in the direction of arrows on line 10—10 in FIG. 9;
FIG. 11 is a view looking in the direction of the arrows on line 11—11 in FIG. 9 with parts broken away; and
FIG. 12 is a perspective view of a modified form of the invention.

Referring first to the embodiment of the invention chosen for illustration in FIGS. 1-4 of the drawings, a water supply line 10 terminates in a threaded end 11 which is secured to a pipe coupling 12. Below this coupling is a flow control valve including a cylindrical valve housing 13 having an upper end threaded into the coupling and a transverse extension 14 threaded into one end of a water conduit 15 which leads to the plurality of sprinkler heads (not shown). A cap 16 is threaded on the lower end of the valve housing 13 and forms a compartment 23.

The center of valve housing 13 has spaced partitions 17 and 18 between which is formed a passage 19 extending into extension 14. The partition 17 contains an opening 20 and provides a valve seat about the opening. A control tube or valve stem 21 extends through opening 20 and closely through openings in partition 18 and in cap 16. A movable pressure wall in the form of a pilot piston head 22 is attached to tube 21 and is movable in pilot chamber 23. The end 21a of tube 21 receives a movable flow control member or core 25 in the form of a rubber valve which is secured between two lock nuts 26 and 27 threaded onto the end of the tube. A passage 30 leads through tube 21 and contains a control wire 32, one end of which supports a rubber filled cap 33 which serves as a pilot valve and is movable into sealing relationship with open tube end 21a.

A leaf spring 35 has upper and lower portions 36 and 37 and threaded tube end 21b extends through portion 36 and is secured thereto by means of two lock nuts 38 and 29. A wire clamp 40 is located adjacent lower spring portion 37 and consists of block sections 41 and 42 which are secured together by screws 43. The control wire 32 extends out of a small opening 44 in tube end 21b and between the block sections 41 and 42 and then through opening 45 in lower spring portion 37. Control wire 32 supports a water container 47 which, in this instance, is a canvas bag. To this end, the lower end 32b of the control wire is formed into a hook which passes through the upper edge 46 of the canvas bag 47. The block 40 is fastened to wire 32 by tightening screws 43 so that the weight of the bag 47 forces block 40 against the lower spring portion 37 and the spring 35 supports the bag. The canvas bag can consist of two side panels 48 and 49 which are stitched together around their edges.

A water bleed line 50 has end 50a connecting with a passage 70 in an extension 71 on housing 13 and the passage 70 extends into communication with passage 19.

The other end 50b of line 50 projects through bag edge 46 into bag 47. The size of the opening in end 50a is adjusted by the tapered end of a control screw 51 which is threaded into the end of extension 71. Therefore, when water is flowing in passage 19 and conduit 15, line 50 will bleed off a small, adjusted amount of water into bag 47. Since the canvas sides 48 and 49 become saturated with water, evaporation will continually take place to slowly remove water from the bag. Also, a bleed outlet tube 55 has a threaded end 55a projecting through the bottom edge 56 of the bag and the end is secured to the bag by clamping outside nut 57 and inside nut 58 against edge 56. The side of tube 55 contains a small opening 60, the size of which is adjustable by the end 75 of a screw 63 which is threaded into the outside end of tube 55. Therefore, the opening 60 can serve to continually bleed water from the bag 47 in an amount determined by the adjusted size of opening 60.

When the flow control device is placed in operation, the canvas bag 47 is light enough that the lower spring portion 37 is not flexed and assumes the full line position of FIG. 1. Water is directed through conduit 10, past valve 25, into conduit 15 which supplies the sprinkler heads. The cap 33 is held in the upper, full line position of FIG. 1 by wire 32 so that water flows through passage 30 in tube 21 into chamber 23 below piston 22 through an opening 75 in tube 21. The pressure of the water on piston 22 holds the valve 25 in raised position so that water can enter conduit 15. After sufficient water has been bled into bag 47 through tube 50, the weight of bag 47 acting through clamp 40 will flex spring 35 into the dotted line position of FIG. 1 so that control wire 32 will pull cap 33 into its dotted line position against the end 21a of tube 21. Thereafter, the flow of water into chamber 23 through passage 30 is stopped and the water already in the chamber will bleed back into tube 21 and through opening 44. The weight of bag 47 is operative on tube 21 to pull the piston 22 downwardly from its full line to its dotted line position in FIG. 1 and at the same time the spring 35 and bag 47 will bodily move downwardly. This further downward movement of bag 47 will seat valve 25 in its dotted line position against seat 20 and cut off the flow of water through conduit 15 to the sprinklers.

When valve 25 is closed, it is held in this condition by weight of bag 47 and by the pressure of the water upstream of the valve. Since water ceases to flow into the bag, from conduit 15 through bleed line 50, the bag commences to lose weight by evaporation and by leakage from opening 60 if the opening is adjusted for leakage. After a period of time, the bag will become light enough so that it will be raised by spring 35 back to its full line position. At the same time, cap 33 will move off of tube end 27b and permit water to flow into chamber 23 to raise valve 25 off its seat so that water can again flow through conduit 15. The control cycle will then commence again since water will again be bled through line 50 into the canvas bag 47.

The upstream water pressure acts with the bag weight to hold cap 33 in seated position whereas this pressure does not aid in the initial seating of the cap. Therefore, the bag 47 must be heavier to seat cap 33, than to release it against the water pressure on the cap when seated. In operation, the tube end 21b will follow the cap 33 upwardly until the piston bottoms out. Since the area of piston 22 is greater than the area of valve 25, the piston will move upwardly, once the water pressure is introduced to chamber 23 through passage 30, lifting the bag with it. The change in weight of bag 47 between the open and closed condition of conduit 15 corresponds to the water pressure acting on the area of the cap when seated against tube end 21b. As the bag 47 fills up, the side panels bulge outwardly as illustrated by the dotted lines of FIG. 4. When it is desired to provide a long period between operations of the sprinkler, the opening 60 is closed and the change in weight of the bag is slowly accomplished by evaporation only. However, when shorter periods are desired, the flow through opening 60 is adjusted to shorten the period by the desired amount.

The modified flow control device 100 of the invention illustrated in FIGS. 5–11 of the drawings comprises a flow control valve 102 and a water ballast means 104 for operating the valve. In this instance, the water ballast means is a rotary ballast container or wheel. Control valve 102 is essentially identical to the flow control valve embodied in the earlier flow control device of the invention. Accordingly, the valve 102 need not be described in detail. Suffice it to say that the valve has an inlet connected to a water supply line 106 and an outlet connected to a water line 108 which leads to the sprinkler heads of the sprinkler system in which the control device is installed. Extending axially through the lower end of the valve 102 is the valve control tube or stem 110 which is secured to the movable flow control member or core (item 25, FIG. 1) and the pilot piston (item 22, FIG. 1) within the valve housing 112. In contrast to the earlier flow control valve of the invention, the lower end of the control tube 110 is slidable in a bearing sleeve 114 which extends through an enlarged central opening in the lower valve cap 116. The bearing sleeve is secured to the cap by a nut 118 and is sealed to the cap by an inner washer (not shown) which is clamped on inner shoulder (not shown) on the sleeve and the end wall of the cap. The bearing sleeve 114 is laterally adjustable, to align the (not shown) which is clamped on inner shoulder (not shown) in the valve body 112, by loosening the valve sleeve and nut 118. Extending axially through and slidable in the control tube 110 is the control wire 120 (FIG. 9) of the flow control valve. The upper end of this control wire is secured to the rubber filled cap or pilot valve (item 33, FIG. 1) of the flow control valve.

Flow control valve 102 operates in the same manner as described earlier in connection with the flow control device of FIGS. 1–4. Thus, assuming that the control tube 110 occupies its lower limiting position, wherein the flow control member or valve core on the upper end of the stem is disposed in seating engagement with its valve seat to cut off water flow through the valve, elevation of the control wire 120 relative to the control tube elevates the cap or pilot valve on the upper end of the wire out of seating engagement with the upper end of the tube. This permits water to pass from the upstream, high pressure side of the currently closed valve core to the pilot chamber in the lower end of the valve. Thus, the pressure of the water within the pilot chamber against the pilot piston in the chamber soon becomes sufficient to elevate the control tube 110 and thereby open the flow control valve 102 to water flow from the supply line 106 to the outlet line 108. Subsequent return of the cap or pilot valve in the upper control wire 120 into seating engagement with the upper end of the control tube 110, by means of a downward force exerted on the control wire, cuts off the passage of water into the lower pilot chamber of the valve. This results in reclosing of the valve due to leakage of water from the pilot chamber through the clearance space between the control tube 110 and its bearing sleeve 114 and through the clearance space between the control wire 120 and the lower end of the control tube.

The rotary ballast container or wheel 104 has a pair of flat parallel side walls 122 rigidly joined by an intervening coaxial cylindrical wall L-shaped partitions 126. The cylindrical wall 124 contains a ballast chamber 128. The partitions 126 define circumferentially opening cups 136, 138 and 140. Each cup has a radial edge wall furnished by that leg of the respective partition 126 which joins the cylindrical wall 124 and an outer edge wall furnished by the remaining leg of the respective partition which is flush with the side walls 122.

Diametrically opposite the cup 138 is a combination filling and drain port 144 opening to the ballast chamber 128. Opening through the wall of the cup 138 is a drain port 146. Cup 140 has an adjustable overflow tube 148.

Extending through the ballast wheel 104, normal to the side walls 122 of the wheel, is an axle 152. The ballast wheel is rigidly fastened to this axle. It is significant to note at this point that the axis of the axle 152 is located at the geometric center of the ballast chamber.

The ballast wheel axle 152 is supported by a yoke 154 including an upper cross member 156 and a pair of depending arms 158. The yoke cross member 156 extends parallel to the axle 152 and is furnished by a pair of clamping bars 160 joined by screws 162. The yoke arms 158 straddle the ballast wheel 104 and are furnished by spring wires. The upper extremities of these yoke arms or wires are secured to the outboard ends of the cross member 156. The lower extremities of the wires are wrapped around the outboard ends of the axle 152, as shown.

Yoke cross member 156 is secured, at its center, to the lower end of the control wire 120 of the flow control valve 102. To this end, the lower end of the control wire is clamped between the clamping bars 160 of the cross member. The cross member 156 is also secured to the lower end of the control tube or valve stem 110 of the flow control valve by means of a leaf spring 164 similar to that embodied in the first form of the invention. The cross member 156 and the leaf spring 164 extend at right angles and are centered relative to one another. The leaf spring has a lower portion 166 and an upper portion 168. The center of the lower spring portion 166 is secured to the center of the yoke cross member 156 in any convenient way. The center of the upper spring portion 168 is apertured to receive the lower end of the control tube 110 and is secured to the tube by means of nuts 170.

Extending from the housing 112 of the flow control valve 102 is a water bleed line 172. Secured to the lower end of this bleed line is a transverse tube 174 which is located directly above and extends normal to the axis of rotation of the ballast wheel 104. Opening through the underside of this tube, adjacent the ends thereof, are a pair of bleed ports 176, 178. Metering valves 180, 182 are threaded in opposite ends of the tube 174 for regulating the effective areas of the bleed ports 176, 178, respectively. As in the previous forms of the invention, the passage in the bleed line 172 opens to the water passage in the flow control valve 102, downstream of its movable flow control member or valve core. Thus, water bleeds from the flow control valve through the bleed line 172 only when the valve is open.

For reasons which will appear presently, it is necessary to limit the rotation of the ballast wheel 104. To this end, the ballast wheel is provided with a pair of limit stops 184 and 186 in the form of rods which extend through the wheel parallel to its axis of rotation and project beyond the side walls 122 of the wheel.

The operation of the flow control device 100 will now be described. The ballast wheel 104 is statically balanced about its geometric center. However, the weight of the wheel coupled with the torsional reaction of the yoke wires 158 acting on the radius of the axle 152 impart a clockwise turning moment to the wheel. When the ballast chamber 128 and cups 136, 138, and 140 of the wheel are completely empty of water, this turning moment causes the wheel to assume and remain stationary in the position shown in FIG. 5 with the stop bar 186 engaging wires 158 to prevent further rotation. As in the previous form of the invention, the rate of the leaf spring 164 and the empty weight of the ballast wheel 104 are related in such a way that when the wheel is completely empty of water, the spring retains the control wire 120 in its upper limiting position of FIG. 5, wherein the cap or pilot valve (item 33, FIG. 1) is elevated out of seating engagement with the upper end of the control tube 110 of the flow control valve to effect opening of the flow control valve to water flow from the supply line 106 to the outlet line 108. Under these conditions, water is bled from the flow control valve 102 through the bleed line 172, the bleed tube 174, and the bleed ports 176, 178. The water emerging from bleed port 176 enters cup 136 which fills to produce a counterclockwise movement on the wheel, thereby causing the wheel to rotate and bring cup 138 into position to be filled. Filling of cup 138 continues the rotation of the wheel until the latter reaches the position shown in FIG. 9, wherein the wheel stop 184 engages the wires 158 to prevent further rotation. Bleed ports 176 and 178 are so located relative to the ballast wheel 104 that when the latter occupies the position of FIG. 9, the water emerging through the bleed port 176 enters the currently upwardly opening left-hand wheel cup 140 and the water emerging through the bleed port 178 enters the ballast wheel chamber 128 through its currently upper fill-drain opening 144. Under the operating conditions thus far stated, therefore, the flow control valve 102 is open to permit water flow through the valve to the sprinkler heads (not shown) at the downstream end of the outlet water line 108.

The water which enters the left-hand ballast wheel cup 140 from the bleed opening 176 produces a counterclockwise torque on the ballast wheel 104 which maintains the ballast wheel stop 184 in firm seating engagement with the wire arms 158 of the wheel supporting yoke 154. Referring to FIG. 9, it will be observed that because of the wrap-around of the wires 158 about wheel axle 152, the weight of the water in the ballast chamber 128 produces a clockwise torque on the ballast wheel, in opposition to the counterclockwise torque produced by the water in the wheel cup 140. The combined weight of the ballast wheel 104 and the water in the wheel cup 140 and the ballast chamber 128 produces a net downward force on the control wire 120 which opposes the upward pilot valve unseating force of the spring 164 and progressively increases as the water levels in the wheel cup and ballast chamber rise. The dimensions of the ballast wheel 104 and the rate of the spring 164 are related in such a way that the spring is effective to retain the control wire 120 in its upper limiting position, and hence the flow control valve 102 in its open condition, until the water in the ballast wheel chamber 128 and cup 140 rises to predetermined levels. At this point, the net downward force exerted on the lower portion 166 of the spring 164 by the combined weight of the ballast wheel 104 and the water in the wheel becomes sufficient to deflect the lower spring portion downwardly to reseat the pilot (item 33, FIG. 1) in the upper end of the control tube 110. This action results in reclosing of the flow control valve 102 in the same manner as described earlier in connection with the first form of the invention to cut off water flow both to the water outlet line 108 and the bleed line 172.

It will be recalled that the water in the ballast wheel cup 140 produces a counterclockwise torque on the ballast wheel 104 which tends to retain the wheel in its normal position of FIG. 9, while the water in the ballast wheel chamber 128 produces an opposing, clockwise torque on the wheel which tends to rotate the latter from its normal position to its position of FIG. 5. In its latter position of the wheel, hereinafter referred to as its drain position, the fill-drain opening 144 of the ballast wheel chamber 128 is located at the bottom of the wheel to permit draining of water from the chamber and the wheel cup 140 is inverted. According to the present invention, the valve is closed when the cup 140 and ballast wheel chamber 128 are filled to the required level with the wheel shown in the position of FIG. 9. The combined center of gravity of the water in cup 140, the water in the ballast chamber 128, and the wheel itself is located slightly to the left of the wires 158. This condition prevails to hold the valve closed until the water in the cup 140 drops to some predetermined lower level. When the water in the cup drops to this lower level, the clockwise torque exerted on the ballast wheel 104 by the water in the ballast chamber 128 becomes sufficient to rotate the wheel to its drain position of FIG. 5.

Water is dissipated from the ballast wheel cup 140 to lower the water level in the cup in two different ways, to wit, by evaporation and by drainage through the drain tube 148 of the cup. At this point, it is significant to recall that the drain tube 148 may be adjusted. This provides a means for regulating the amount of water that must be evaporated from the wheel cup 140. For example, the tube may be raised until the water level in the cup 140 may require several days to evaporate sufficiently to effect rotation of the ballast wheel 104 to its drain position of FIG. 5. Alternatively, the drain tube 148 can be lowered to permit enough of the water to drain from the cup 140 through the tube to achieve a delicate balance so only a few minutes of evaporation will be required to produce rotation. In this manner the time the valve remains closed can be adjusted from a few minutes to many hours, depending upon the position of the tube. Once the balance is upset by evaporation of the water in the cup 140, a strong rotating force is set up that positively turns the wheel to quickly dump all of the water, whereby immediate and positive opening of the valve is assured.

Draining of water from the ballast wheel 104 upon rotation of the latter to its drain position of FIG. 5 reduces the downward force exerted by the wheel on the lower portion 166 of the spring 164 sufficiently to enable the spring to again reopen the flow control valve 102. Water flow then again occurs from the water supply line 106 to the water outlet line 108 and the bleed line 172, and bleed water again occurs through the bleed ports 176, 178 in the bleed tube 174. The operating cycle of the control device 100 is then repeated.

The rate at which water is bled to the ballast wheel 104 through the bleed ports 176, 178 may be regulated by the metering valves 180, 182 threaded in the ends of the bleed tube 174. Adjustment of these metering valves regulates the rate at which the ballast wheel 104 is filled with water and hence the open time of the flow control valve 102. It is now evident, therefore, that the length of time which the flow control valve 102 remains open during each operating cycle of the flow control device 100 may be regulated by adjustment of the metering valves. The modified flow control device 200 illustrated in FIG. 12 is similar to that just described except that the ballast wheel 104 is carried by a rigid yoke 202 having light spring bands 204 which are secured to the yoke arms around the wheel axle 152. The yoke has a rigid cross member 206 secured to the valve control wire 120 and a spring leaf 208 secured to the valve stem 110, in this case, the bands 204 uncoil when the ballast wheel fills with water to permit rotation of the wheel to its drain position. The spring leaf 208 deflects to permit operation of the valve 102 in the same manner as described above in connection with FIGS. 5–11.

It is therefore apparent that the present invention provides an automatic sprinkler control system which does not require additional power to operate the valve in the water flow line. Any suitable container can replace the canvas bag since a time interval can be obtained solely by a bleed if evaporation is not desired for control. Also, any suitable type of bias, other than a leaf spring, can be used to oppose the weight of the water container.

What is claimed is:
1. A water flow control device comprising:
   a flow control valve having a main water passage with an inlet and an outlet and a main valve member within said passage between said inlet and outlet;
   a ballast container;
   means for bleeding water at a controlled rate from said passage downstream of said valve member to said container when said main valve member is open, thus to increase the effective weight of said container;
   means for effecting evaporation and drainage of water from said container to reduce the effective weight of said container when said main valve is closed; and
   pilot means for closing said valve member in response to increasing weight of said container and opening said valve member in response to decreasing weight of said container, said pilot means including a pilot chamber communicating through a pilot passage to said main passage upstream of said valve member, a movable pressure wall exposed to water pressure in said pilot chamber and connected to said valve member for opening said valve member in response to increasing water pressure in said pilot chamber, a pilot valve which opens against the pressure in said main passage upstream of said main valve member for controlling water flow through said pilot passage to said pilot chamber, means connecting said container and pilot valve for closing said pilot valve in response to increasing weight of said container, a spring connected to said pilot valve for opening said pilot valve in response to decreasing weight of said container, means for draining water from said pilot chamber to reduce pilot chamber pressure when said pilot valve is closed, and means for closing said main valve in response to decreasing water pressure in said pilot chamber.

2. A water flow control device according to claim 1 wherein:
   said main valve member opens against and closes with water pressure in said main passage upstream of said main valve member.

3. A water flow control device according to claim 1 wherein:
   said means for closing said main valve member comprises means connecting said container and main valve member whereby increasing weight of said container closes said main valve member in response to decreasing water pressure in said pilot chamber.

4. A water flow control device according to claim 3 wherein:
   said main valve member opens against and closes with water pressure in said main passage upstream of said main valve member.

5. A water flow control device according to claim 1 wherein:
   said main valve member opens upwardly against and closes downwardly with gravity and water pressure in said main passage upstream of said main valve member,
   said flow control valve has a valve seat engageable by said main valve member in closed position,
   said main valve member has a tubular stem extending through the underside of said flow control valve,
   said pilot chamber surrounds and said pressure wall is fixed to said stem,
   said stem contains a passage which opens upwardly to said main passage upstream of said valve seat and downwardly to said pilot chamber below said pressure wall and through the underside of said stem to define said pilot passage and said pilot chamber drainage means,
   said means connecting said container and pilot valve comprises a member extending through said stem, and
   said spring is connected between the latter member and said stem, whereby said container also comprises said main valve closing means.

6. A water flow control device according to claim 1 wherein:
   said container comprises a canvas bag having porous walls for effecting evaporation of water from said bag and a drainage valve at the bottom of said bag through which water may drain from said bag, said porous walls and drainage valve comprising said means for effecting evaporation and drainage of water from said container.

7. A water flow control device according to claim 1 wherein:
said container comprises a hollow rotary ballast wheel, means supporting said wheel for rotation between a fill position wherein said wheel is disposed to receive and contain water from said bleed means and a drain position wherein said wheel is disposed for draining of water from said wheel, and means for inducing rotation of said wheel to fill position in response to emptying of said wheel and to drain position in response to filling of said wheel.

8. A flow control device according to claim 7 wherein:
said rotation inducing means includes cup means disposed about the wheel for receiving water from said bleed means to produce a torque in one direction on said wheel for rotating said wheel to said fill position, a ballast chamber in said wheel, a chamber fill-drain opening in said wheel disposed to receive water from said bleed means for filling of said chamber to a predetermined level when said wheel occupies said fill position and to drain water from said chamber when said wheel occupies said drain position;
means whereby filling of said chamber to said predetermined level produces a torque in the opposite direction of said wheel for rotating said wheel to said drain position;
said cup means comprise a cup which fills with water to a predetermined upper level when said wheel occupies said fill position to produce a torque in said one direction on said wheel greater than the torque in said opposite direction produced by water filling said chamber to said predetermined level, whereby water filling said cup to said upper level retains said wheel in said fill position, and said means for effecting evaporation and drainage of water from said container includes means for evaporating and draining water from said cup to a lower level, wherein the torque produced on said wheel in said opposite direction by water filling said chamber to said predetermined level is effective to rotate said wheel to said drain position.

9. A water flow control device according to claim 8 wherein said last mentioned means includes an opening in said cup through which water may evaporate from said cup.

References Cited
UNITED STATES PATENTS

| | | | |
|---|---|---|---|
| 725,557 | 4/1903 | Goodwin et al. | 137—408 |
| 1,162,957 | 12/1915 | Watrous | 251—39 XR |
| 1,822,901 | 9/1931 | De Lacy-Mulhall | 137—408 XR |
| 1,898,248 | 2/1933 | Gaines | 137—408 XR |
| 2,965,117 | 12/1960 | Gallacher | 137—78 |
| 3,273,579 | 9/1966 | Koculyn | 137—80 |

WILLIAM F. O'DEA, Primary Examiner

R. GERARD, Assistant Examiner

U.S. Cl. X.R.

137—408, 624.4; 222—70; 251—39